C. & O. A. FLAGSTAD.
FOLDING BOX OR CRATE.
APPLICATION FILED APR. 23, 1917.

1,264,912.

Patented May 7, 1918.
3 SHEETS—SHEET 1.

INVENTORS:
C. FLAGSTAD & O. A. FLAGSTAD.
BY THEIR ATTORNEY:
A. M. Carlsen.

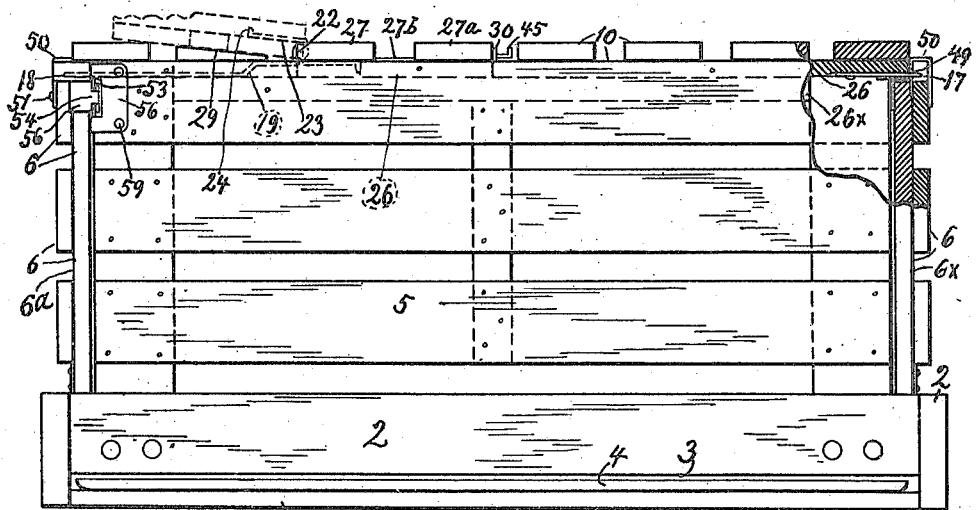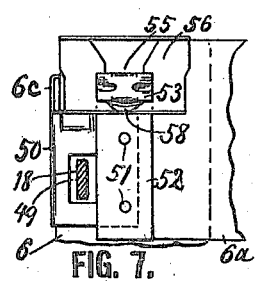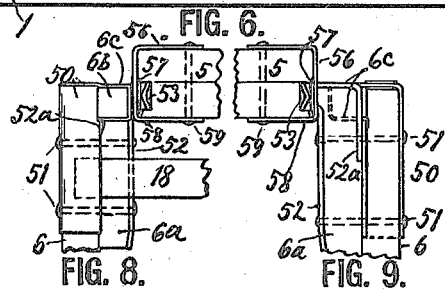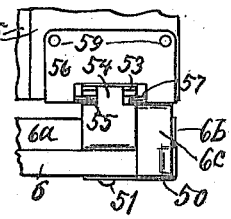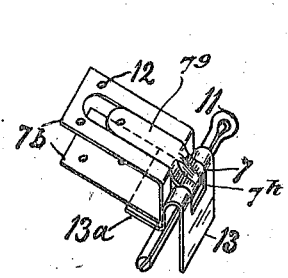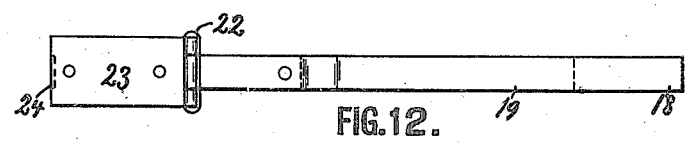

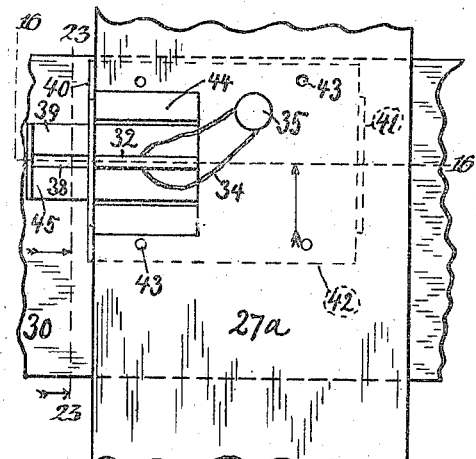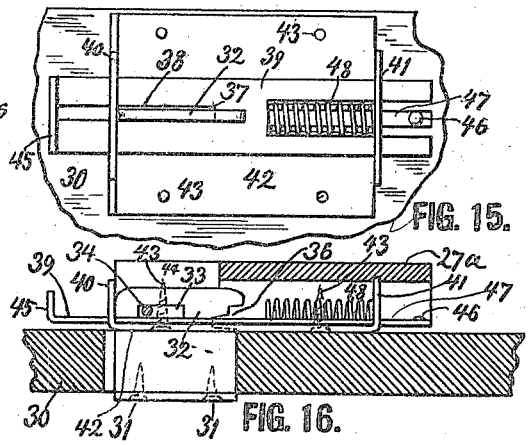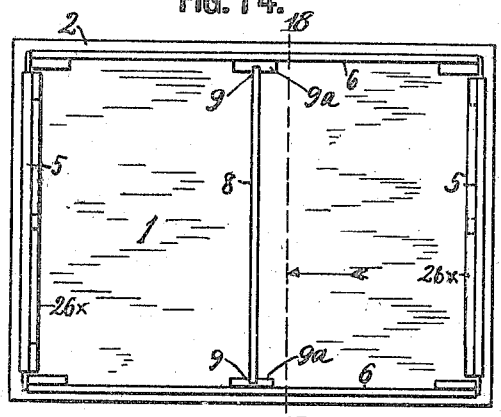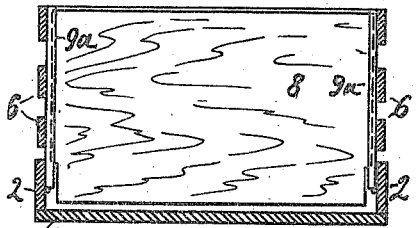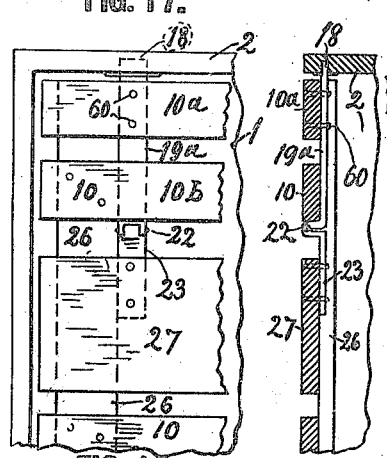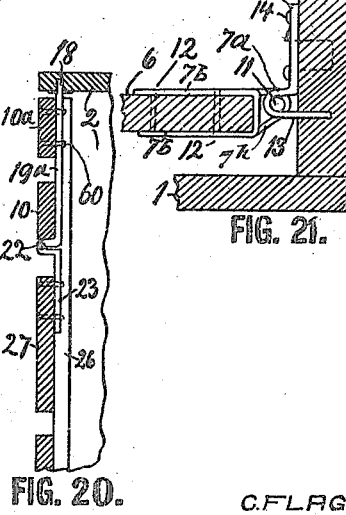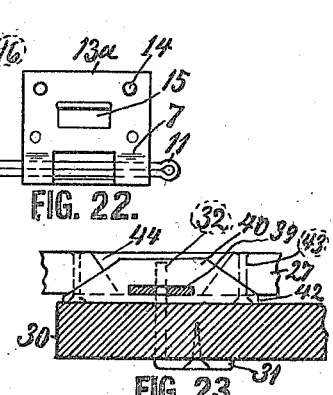

UNITED STATES PATENT OFFICE.

CORNEL FLAGSTAD AND OSCAR A. FLAGSTAD, OF MINNEAPOLIS, MINNESOTA, ASSIGNORS TO FOLDING CRATE AND BOX COMPANY, OF MINNEAPOLIS, MINNESOTA.

FOLDING BOX OR CRATE.

1,264,912.  Specification of Letters Patent.  Patented May 7, 1918.

Application filed April 23, 1917. Serial No. 163,818.

*To all whom it may concern:*

Be it known that we, CORNEL FLAGSTAD and OSCAR A. FLAGSTAD, citizens of the United States, residing at Minneapolis, in the county of Hennepin and State of Minnesota, have invented a new and useful Folding Box or Crate, of which the following is a specification.

Our invention relates to folding boxes and crates, and the general object is to provide a sanitary, durable and conveniently closed and locked folding box or crate for shipping birds, chickens and other fowls and animals in.

In the accompanying drawings:—

Figure 1 is a top view of the crate complete in folded position. Fig. 2 is a side elevation of Fig. 1, showing in folded position one side section and its hinges in dotted lines. Fig. 3 is an end view of Fig. 1. Fig. 4 is another end view of the crate with a portion broken away as on the line 4—4 in Fig. 1. Fig. 5 is a section about as on the line 5—5 Fig. 1, on an enlarged scale. Fig. 6 is an end elevation of the crate, set up, with a portion of one corner broken away. Fig. 7 is Fig. 8 seen from the right with the wood 5 omitted. Fig. 8 is a top view of three corner irons employed to hold in set up position the end sections and side sections of the crate. Fragments of said wooden sections are but faintly indicated in said views. Fig. 9 is a bottom view of Fig. 8. Fig. 10 is a top view of Fig. 7. Fig. 11 is a perspective view of one of the hinges holding the side and end sections to the base. Fig. 12 is a top view of a part of the cover fastening device. Fig. 13 is an edge view of Fig. 12. Fig. 14 is an enlarged portion near the middle of Fig. 1, showing more clearly the combined cover and lid locking device. Fig. 15 is the same view as Fig. 14 but with the board 27$^a$ omitted. Fig. 16 is a section about as on the line 16—16 Fig. 14 with the metallic parts intact. Fig. 17 is a top view of the crate with the cover removed. Fig. 18 is a sectional view on the line 18—18 Fig. 17. Fig. 19 is the upper left hand corner of Fig. 1, with a modification. Fig. 20 is Fig. 19 seen from right to left. Fig. 21 is an enlarged portion near the right hand end of Fig. 5, showing more clearly the hinge of the side section. Fig. 22 is a face view of the upper hinge member in Fig. 21. Fig. 23 is a section on the line 23—23 in Fig. 14.

Referring to the drawing by reference numerals, the base of the crate is hollow, consisting of a bottom 1 having all around it an upstanding rim 2, in which there is a slit 3 (see Fig. 3) for the insertion of a removable false bottom or pan 4, which serves as a gathering and removing device for wasted feed and other dirt which accumulate from fowls or animals kept in the crate.

The crate is further composed of two skeleton end sections 5 and two skeleton side sections 6; each of said sections being secured with its lower edge to the inner side of the rim 2 by a pair of hinges 7 on the end sections and 7$^a$ on the side sections, the hinges 7 are secured so much lower down than the hinges 7$^a$ that the end sections may be folded first upon the bottom and then the side sections upon the end sections.

At the middle of the crate is a partition board 8 having its ends dropped down into grooves 9 in cleats 9$^a$ of the side sections; when the crate is to be folded, said board is lifted out of the grooves and placed flat upon the bottom of the box, or in the pan 4 if the latter is used, and then the end and side sections folded as stated; and lastly a skeleton cover 10 is placed upon the sections and secured within the hollow base; and when the crate is set up the same cover is secured between and partly resting upon the end sections and at the middle upon the grooved cleats 9$^a$ of the side sections, and is locked and even sealed, all by means which as well as other parts will now be described more in detail.

The hinge members of the sections are attached together by a removable cotter pin 11, so as to make each section easily detachable for repair. The hinge members fixed on the sections are all alike, having a fork or pair of flat arms 7$^b$, one of which arms having a struck-up tongue 7$^g$ forming the loop 7$^h$ for the pintle or pin 11 (see Figs. 11 and 21) secured by rivets 12 one to each side of the section; the hinge members fixed on the base have each a horizontal wing 13 inserted in the rim of the base and main plate 13$^a$ secured by rivets 14 to the rim 2; of said hinge members on the base rim those adjacent the side sections are each provided with an aperture 15 (see Fig. 22) with a pocket 16 in the rim beyond it (see Figs. 5 and 21). The cover is provided with two fixed metallic fingers 17 (in Fig. 1) projecting when the crate is folded into two of said apertures 15, while into the two apertures 15 opposite therefrom may be projected the outer ends 18 (see Fig. 5), of two slidable metal bars 19, which are guided in recesses in the wooden cover and are therein retained by metallic cleats 20 (see Figs. 1 and 5). As best shown in Figs. 13 and 5, said metal bars 19 are each offset upwardly through an aperture 21 in the cover and is hinged at 22 to one end of a plate 23, which at its other end has a downward tooth 24 arranged to engage a shoulder 25 of the cross bar 26 of the cover and thereby hold the offset bar 19 in the socket 16.

The plates 23 are secured to the underside of a hand-hole lid 27, which in Fig. 19 consists of a single board or strip but in Fig. 6 and other views is shown as composed of two strips 27, 27$^a$ secured together by cleats 27$^b$ (see Fig. 1). Said lid is as long as the cover and serves to close the opening 28 through which the crate is filled and emptied. To allow said lid to fold into supported position when open and when closed the hinge pintles 22 are arranged almost up to the top of the cover 10 and the latter is beveled at the top as shown at 29, where it supports the open lid.

To hold the lid closed temporarily and also permanently during transportation, the middle cross bar 30 of the cover is provided with a fixed plate 31, having a vertical wing 32 extending up through the bar and is provided with an aperture 33 for the sealing wire 34 of a seal 35. If so desired a padlock may take the place of the seal and its wire. Said wing 32 is also provided with a notch 36, adapted to receive the terminal 37 (see Fig. 15) of a slot 38 of a slide 39, which is guided in the upstanding flanges 40, 41 of a plate 42 secured by screws or rivets 43 to the lid 27$^a$. Said lid has a clearing 44 through which to reach and insert the sealing wire 34 and said slide 39 has one end projected and provided with a finger catch 45 and its other end provided with a stop 46 to engage the flange 41 and thereby prevent displacement of the slide. The slide also has a tongue 47 with a compressible coil spring 48 upon it, which at all times tend to interlock the slide with the notch 36, and the same can only be unlocked therefrom by pressing at the finger catch 45 against the resistance of the spring.

When the crate is set up, as in Fig. 6 the cover 10 rests with its ends upon the end sections 5 and at the middle upon the cleats 9$^a$ of the side sections, and the catches 17 and 18 engage in apertures 49 of corner irons 50 fixed on the side sections by rivets 51 (see Figs. 7, 8, 9, 10). On said rivets is also secured a member 52 having a cam-shaped T-head 53, adapted to enter with its neck 54 (see Fig. 10) into a gap 55 in a corner iron 56 fixed on the end section 5, and having cams 57, which as the sections swing into vertical position engage the T-heads and draw the sections into firmly locked positions, whereupon the necks and heads stop against the part 58 of the iron 56 and thereby prevent outward folding of the end sections while the heads 53, being wider than the gaps 55, prevent outward folding of the side sections, and inward folding of them is prevented by the ends of the cross cleats 26 and 30 of the cover, but inward falling of the end sections is prevented by the cleats 26, which are in contact with the reinforcing strips 26$^x$ of the end sections, shown in Fig. 17.

In Fig. 8 is clearly shown how the catch 18 passes above the iron 52 and into its socket in the iron 50 and the horizontal top bar 6 of the side section; 6$^a$ is the end cleat of section 6, and 6$^b$ is an upward projection of the cleat 6$^a$ steadied by being inserted in a socket 6$^c$ of the iron 50. It will also be noted in Figs. 8 and 9 that the iron 56 is U-shaped so it clasps the corner of the end section and is secured thereto by rivets 59. Also that the iron 52, having the head 53, has an arm 52$^a$ inserted between the parts 6 and 6$^a$ of the side section. All of said metallic corner pieces being formed and secured as shown may be very cheaply made by stamping them out of comparatively thin galvanized iron.

In the modification shown in Figs. 19 and 20, the locking bar is straight and secured at 60 to the slat 10$^a$ of the cover 10. In this event the slat or bar 10$^a$ slides upon the bars 26, the same as the lid 27 to which it is connected by the parts 19$^a$, 22 and 23. The bar 19$^a$ is held against upward displacement by the bar 10$^b$ of the cover and against downward displacement by the parts 27 and 10$^a$ being upon the cleats 26 and the middle cleats 30 of the cover. In this as in the main form of the invention the catches 18 are held in engaged positions with the crate either folded or set up, mainly by the locking device 32, 39, 42, &c., already fully described.

What we claim is:

1. In a folding box or crate, a hollow base, end sections hinged to the base and adapted to fold into the hollow base, side sections hinged to the base and arranged to fold upon the end sections, automatically interlocking metal catches on the upper corners of the sections to secure them together and prevent them from swinging outward beyond a vertical position, a non-extensible cover arranged to rest partly upon and pass partly down between the sections when they are set up, fixed fingers at one edge of the cover and at the opposite edge fingers guided to slide in a transverse direction of the cover, one of said side sections having metallic sockets inserted flush with the top edge and the inner side of each section for the fixed fingers to engage, the other side section having sockets for the slidable fingers to enter, said cover having an elongated hand hole, a lid arranged to close the hand hole, said lid being hingedly connected with the slidable fingers and means for locking the lid when the slidable fingers are in the sockets.

2. In a folding box or crate, a hollow base, end sections hinged to the base and adapted to fold into the hollow base, side sections hinged to the base and arranged to fold upon the end sections, automatically interlocking metal catches on the upper corners of the sections to secure them together and prevent them from swinging outward beyond a vertical position, a non-extensible cover arranged to rest partly upon and pass partly down between the sections when they are set up, fixed fingers at one edge of the cover and at the opposite edge fingers guided to slide in a transverse direction of the cover, one of said side sections having metallic sockets inserted flush with the top edge and the inner side of each section for the fixed fingers to engage, the other side section having sockets for the slidable fingers to enter, said cover having an elongated hand hole, a lid arranged to close the hand hole, said lid being hingedly connected with the slidable fingers and means for locking the lid when the slidable fingers are in the sockets, and sockets in the base for the reception of all of said fingers when the sections are folded and the cover placed upon them in the base.

3. In a folding box or crate, a hollow base, end sections hinged to the base and adapted to fold into the hollow base, side sections hinged to the base and arranged to fold upon the end sections automatically interlocking metal catches on the upper corners of the sections to secure them together and prevent them from swinging outward beyond a vertical position, a non-extensible cover arranged to rest partly upon and pass partly down between the sections when they are set up, fixed fingers at one edge of the cover and at the opposite edge fingers guided to slide in a transverse direction of the cover, one of said side sections having metallic sockets inserted flush with the top edge and the inner side of each section for the fixed fingers to engage, the other side section having sockets for the slidable fingers to enter, said cover having an elongated hand hole, a lid arranged to close the hand hole, said lid being hingedly connected with the slidable fingers and means for locking the lid when the slidable fingers are in the sockets, and sockets in the base for the reception of all of said fingers when the sections are folded and the cover placed upon them in the base, said sockets being formed in the hinge members at the base and in the corner catches of the side sections.

4. In a folding box or crate, the combination with a cover having an elongated hand hole and a lid closing the same, said cover having fixed and also slidable catches for holding it to the box, said lid being hingedly attached to the slidable catches, and said cover being thinner for some distance where the lid rests upon it when open, so as to relieve strain on the hinges.

5. In a foldable box or crate, a cover to close the top of the crate, some fixed and some slidable fingers on the cover for engaging the crate and holding the cover on it, said cover having a hand hole, a lid hingedly connected with the slidable fingers and adapted to close the hand hole, and means for locking the lid when the slidable fingers are in position to hold the cover secured; said locking means comprising a metallic wing projecting above a portion of the cover near the middle thereof and having a lateral notch, a metallic plate secured underneath the lid and having apertured upward flanges, a flat bar slidable in the apertures of the flanges and having a slot for the wing and at one end a finger catch, a spring arranged to normally hold the slide with one terminal of its slot into the notch of the wing.

6. In a folding box or crate, a cover to close the top of the crate, some fixed and some slidable fingers on the cover for engaging the crate and holding the cover on it, said cover having a hand hole, a lid hingedly connected with the slidable fingers and adapted to close the hand hole, and means for locking the lid when the slidable fingers are in position to hold the cover secured; said locking means comprising a metallic wing projecting above a portion of the cover near the middle thereof and having a lateral notch, a metallic plate secured underneath the lid and having apertured upward flanges, a flat bar slidable in the apertures of the flanges and having a slot for the wing and at one end a finger catch, a spring arranged to normally hold the slide with one terminal of its slot into the notch of the wing, said wing or flat post having also an aperture adapted to receive a wire of a seal or other locking means.

7. In a folding box or crate, a hollow base, two opposite body sections hinged to the base to fold into it, two other body sections hinged to the base to fold upon the first mentioned sections, automatically interlocking catches on the upper corners of the sections to secure them together and prevent either and all of them from swinging outward beyond a vertical position, and two of them from swinging inward from said position; the other two sections having their upper edges provided with sockets, a non-extensible cover for the top of the crate, fixed fingers on the cover for entering the said sockets in one section, and slidable fingers on the cover for engaging in the sockets in the opposite section, a member slidable on the cover and connected with the slidable fingers, and means for locking said member when the slidable fingers are in the sockets.

In testimony whereof we affix our signatures.

CORNEL FLAGSTAD.
OSCAR A. FLAGSTAD.

Copies of this patent may be obtained for five cents each, by addressing the "Commissioner of Patents, Washington, D. C."